Feb. 28, 1956 G. C. SZIKLAI ET AL 2,736,761

COLOR TELEVISION IMAGE SIGNAL TRANSLATING SYSTEMS

Filed June 26, 1952 4 Sheets-Sheet 1

INVENTOR.
George C. Sziklai &
Ray D. Kell

BY

ATTORNEY

COLOR TELEVISION IMAGE SIGNAL TRANSLATING SYSTEMS

Filed June 26, 1952 4 Sheets-Sheet 2

INVENTOR.
George C. Sziklai &
Ray D. Kell
BY
ATTORNEY

INVENTORS
George C. Sziklai &
Ray D. Kell
BY [signature]
ATTORNEY

INVENTOR.
George C. Sziklai &
Ray D. Kell
BY [signature]
ATTORNEY

United States Patent Office 2,736,761

Patented Feb. 28, 1956

2,736,761

COLOR TELEVISION IMAGE SIGNAL TRANSLATING SYSTEMS

George C. Sziklai and Ray D. Kell, Princeton, N. J., assignors to Radio Corporation of America, a corporation of Delaware Application June 26, 1952, Serial No. 295,614

20 Claims. (Cl. 178—5.2)

This invention relates to the translation of signals representative of color images, and more particularly, but not exclusively, to systems for recording television signals representative of color images on black and white film, or other monochromatic recording media, in a manner permitting the recovery of color television signals therefrom. This invention also contemplates systems for utilizing a record produced in accordance with the invention to effect recovery of the recorded color television signals, whereby these signals may be transmitted to remote color or black and white television receivers, or may be used to effect local reproductions of the original images in color or in black and white.

The recording of color television programs by "kinescope" recording on color film has several drawbacks as a practical commercial method, a major one being the difficult, expensive and time-consuming procedure involved in processing and printing color film. This invention avoids the difficulties inherent in color film use, by providing a system whereby ordinary black and white motion picture film may be used as a recording medium for color television signals.

In accordance with an embodiment of the present invention, a subcarrier wave phase modulated with color hue information, and amplitude modulated with color saturation information, and a brightness signal are simultaneously applied to control the intensity of the scanning beam of a kinescope. This produces a brightness picture and a color-informative pattern on the kinescope screen which may be recorded by photographing an ordinary black and white motion picture film. Several reference frames of the pattern formed by applying only the subcarrier in a reference phase and reference amplitude condition to control the beam intensity of the kinescope may be additionally recorded. Flying spot scanning of the film record, in accordance with additional aspects of the present invention which provide compensation for scanning non-linearities, effects a recovery of the recorded signals which may then be utilized for local reproduction of the original program or scene in color (or in black and white) as in a theatre, or may be utilized in the reconstitution of a composite color television signal suitable for transmission to remote color (or black and white) image reproducers, such as home-type television broadcast receivers.

The present invention thus provides a simple, economical system for the recording of color television programs being transmitted by a broadcast station, the record film being subject to rapid processing and editing, and thus being quickly available for utilization in retransmission by other broadcast stations, or in the direct reproduction of the program in color (or black and white) in theatres and the like. Similarly the invention provides an advantageous system for recording the color television pickup of scenes which are not to be broadcast immediately but are to serve as portions, or the entirety, of subsequently broadcast news programs, interviews, sportscasts, plays or other program material, or are to be subsequently reproduced in color (or black and white) in theatres and the like.

A primary object of the present invention is to provide a novel color image signal translating system.

Another object of the present invention is to provide a novel method of, and system for recording signals representative of the brightness and color of image elements whereby the record thus made may be utilized to subsequently effect faithful color reproductions of the original images.

Another object of the present invention is to provide a system for recording color television signals on black and white film whereby the color television signals may be subsequently recovered from the film record so formed.

A further object of the present invention is to provide a system for recording color television program material on black and white film whereby the black and white film record may be used to subsequently produce color television signals suitable for broadcast or rebroadcast transmission.

An additional object of the present invention is to provide a system for recording signals representative of the brightness and color of image elements on black and white film whereby the film record may be used in subsequent display reproduction of color pictures corresponding to the original images.

Another object of the present invention is to provide a system for forming a black and white film record of image-representative color television signals, which record is equally applicable to subsequent use in producing color television signals suitable for transmisison to remote image reproducers, in producing black and white television signals suitable for transmission to remote image reproducers, in effecting local display reproduction of the recorded images in color, or in effecting local display reproduction of the recorded images in black and white.

Another object of the present invention is to provide a system for recovering color television signals from a black and white film record.

A further object of the present invention is to provide a system for utilizing a black and white film record of image-representative color television signals to reconstitute color television signals representative of the recorded images.

An additional object of the present invention is to provide a system for utilizing a black and white film record of image-representative color television signals to effect display reproduction of the recorded images.

Another object of the present invention is to provide a novel method of, and system for, recording color television signals whereby black and white film, magnetic tape or other "monochromatic" media may serve as the recording medium.

Other and incidental objects of the invention will be apparent to those skilled in the art from a reading of the following specification and an inspection of the accompanying drawings in which.

Figure 1:
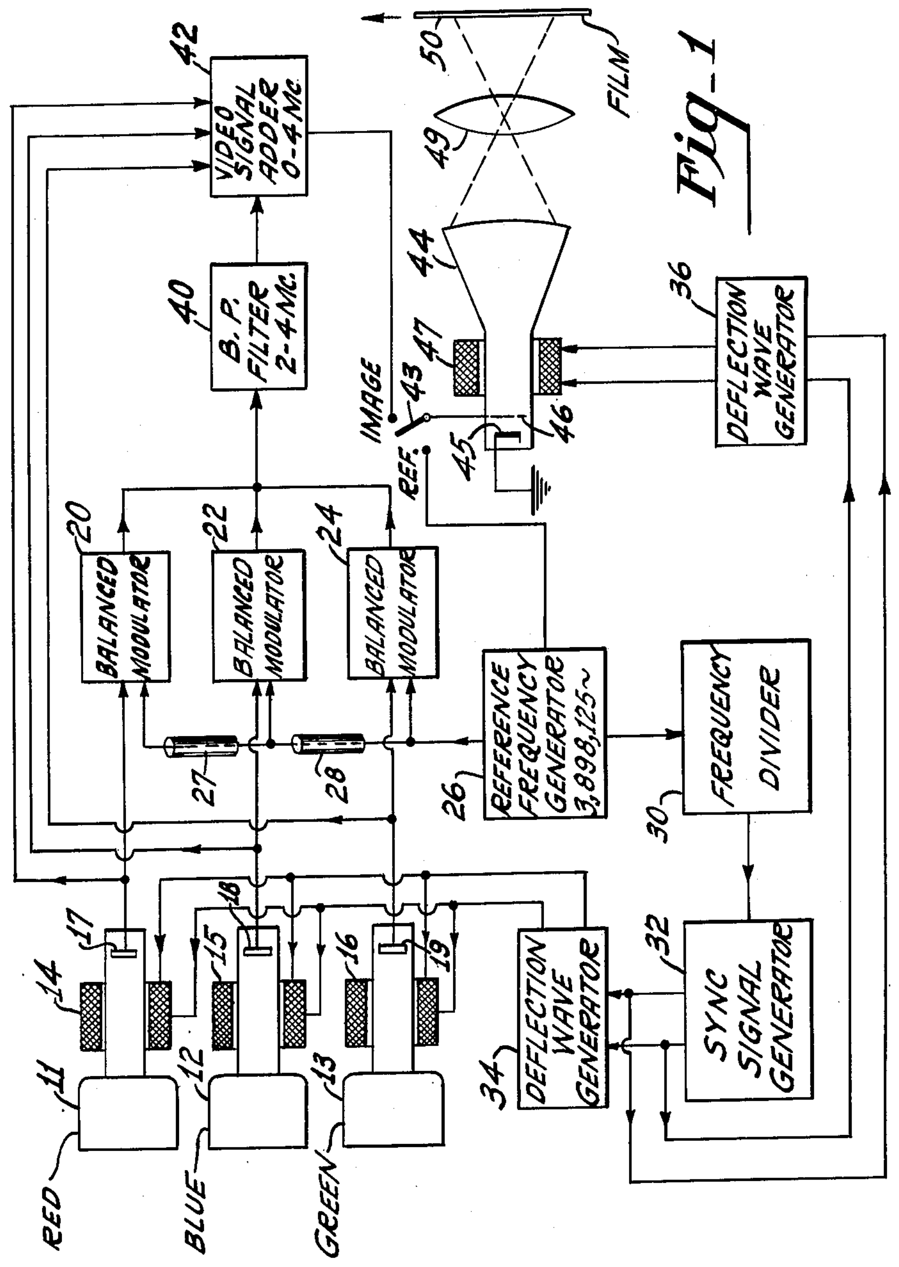
Figure 1 shows in block and schematic form a system for recording on black and white film signals derived from a color television pick-up system of the simultaneous type.

Referring first to Fig. 1, there is shown apparatus for recording signals generated by a color television pickup system of the simultaneous type. While a basic type of simultaneous color pickup system, employing three camera tubes, has been shown for illustrative purposes, it will be readily appreciated that the invention is applicable to use with other basic, modified, or improved types of simultaneous color pickup systems, such as those employing a single color camera tube. The essence of the desired pickup system operation, whatever type is employed, is to simultaneously provide (1) a source of signals representative of the brightness of the images to be recorded and (2) a source of signals representative of the chromaticity (i. e. hue and saturation) of those images.

As pointed out before, the present invention is applicable to the storage and subsequent reproduction of video signals in situations where the signals are also being broadcast or otherwise transmitted during the time of recording, as well as in situations where the signals are not being broadcast during the time of recording. Thus it will be understood that portions of the system shown in Fig. 1 may also be serving as portions of an active television transmitting arrangement, suitable connections (not shown) being made from the apparatus in Fig. 1 to other conventional portions of the transmitting arrangement.

The pickup system shown in Fig. 1 includes the three camera tubes: a red-responsive camera tube 11, a blue-responsive camera tube 12, and a green-responsive camera tube 13, which are illustrated as image orthicons but may alternatively be iconoscopes, vidicons, image dissectors or other image pickup devices. The camera tubes are provided with the customary electrodes and control apparatus such as beam deflection yokes 14, 15, and 16 for developing at their respective output electrodes video signal trains representative of the red, blue, and green color components of the subject images.

Portions of these signals are fed directly to a video signal adder 42 to provide a wide-band signal representative of the brightness of the images.

The output electrodes 17, 18, and 19 of the color camera tubes are also coupled respectively to red, blue, and green balanced modulators 20, 22, and 24. The three modulators are also fed with three different phases of a subcarrier wave (having a frequency to be referred to as the color sampling frequency) produced by the reference frequency generator 26. While delay lines 27 and 28 have been shown as included in the connections from the generator 26 to the modulators to achieve the desired feeding of three different phases of the color sampling frequency wave to the respective modulators, it will be readily appreciated that other types of phase shifting or phase splitting devices may be employed for that purpose.

The color sampling frequency is related to the horizontal and vertical deflection frequencies in a predetermined manner. If the color sampling frequency is an odd multiple of one-half of the horizontal deflection frequency, in a television system in which a frame consists of an odd number of horizontal lines reproduced in two vertically interlaced fields, there may be effected a horizontal interlacing of the reproduced color picture elements. Horizontal interlacing broadly is described in greater detail in a bulletin published October 1949 by Radio Corporation of America and titled "Synchronization for Color Dot Interlace in the RCA Color Television System." Details of a horizontal dot interlacing system in which the color sampling frequency has the described relation to the deflection frequencies are included in another bulletin published February 1950 by Radio Corporation of America and titled "Recent Developments in Color Synchronization in the RCA Color Television System." Such horizontal dot interlacing systems are covered in a copending U. S. patent application of Randall C. Ballard, Serial No. 117,528, filed September 24, 1949 and titled "Systems of Color Television," now U. S. Patent Number 2,678,348 issued May 11, 1954. Assuming the system of Figure 1 to have the described relationship of the color sampling frequency and the horizontal and vertical deflection frequencies, it is convenient, in order to definitely maintain these relationships, to derive all frequencies from a common generator.

Accordingly, the transmitting apparatus of Figure 1 is provided with the reference frequency generator 26. In order to more clearly describe the operating details of the system embodying the present invention, it will be assumed, primarily for illustrative purposes, that the reference frequency generator has a frequency of 3,898,125 cycles per second. This also is herein assumed to be the color sampling frequency, so that the color sampling frequency waves supplied to the balanced modulators are derived directly from the output of the reference frequency generator 26. In order to derive the electron beam deflection frequencies from the reference frequency generator 26, the output of this generator is impressed upon a frequency divider 30. Effectively, this apparatus divides the output of the reference frequency generator by a factor of 123.75. One way in which this may be done is by making successive divisions of 5, 9, and 11 and then making a multiplication of 4.

By means of the divider 30, there is produced a frequency of 31,500 cycles per second, which is impressed upon a conventional sync signal generator 32. This apparatus may be the usual form of generator in which the 31,500 cycle frequency is divided by a factor of 2 to produce the 15,750 cycle frequency at which to energize the horizontal deflection coils of the yokes 14, 15, and 16 for the color camera tubes. Also, the division of the 31,500 cycle frequency by a factor of 525, the assumed number of horizontal lines of the picture, produces a 60 cycle frequency at which to energize the vertical coils of the deflection yokes in the usual manner. The substantially sawtooth horizontal and vertical deflection waves for impression upon the yokes are produced conventionally by deflection wave generators 34 under the control of the sync signal generators 32.

It should be pointed out that this time, however, that the invention is not restricted to systems wherein the color sampling frequency is chosen to provide horizontal dot interlace. There are color television pickup systems, particularly those involving a single tri-color camera tube, wherein dot interlace is not practiced, and the color sampling frequency does not therefore bear an odd-multiple relationship to half the line frequency. Thus, while the particular color sampling frequency mentioned above and the tie-in arrangement between color sampling frequency generation and deflection wave generation depicted in Fig. 1 are illustrattive of an embodiment, the invention is not to be construed as limited thereto.

Returning to the operation of the modulators 20, 22, and 24, each modulator effectively acts to amplitude modulate the appropriately phased color sampling frequency wave fed to one of its input terminals with the respective color signal simultaneously appearing at its other input terminal. With the outputs of the three modulators tied to a common output terminal, the resultant output wave is a wave of color sampling frequency shifting in phase in accordance with the hue of the colors of the subject elements being scanned by the camera, and modulated in amplitude in accordance with the degree of saturaion of the colors of the subject elements being scanned.

This resultant output wave, bearing hue and saturation information in the form of phase modulation and amplitude modulation respectively, is fed through a high-pass filter 40 to the video signal adder 42 to be combined with the wide-band brightness signal.

The composite signal output of the adder 42 is applied (via switch 43, thrown to "image" position) to the grid of an image reproducing device 44, which serves to convert the brightness and chromaticity signals into superimposed visual displays. The image reproducing device 44 may be a black and white kinescope, of the conventional type employed in presently known kinescope recording systems, the kinescope having as a beam source an electron gun assembly including a cathode 45 and a control grid 46, and having beam deflection apparatus including a beam deflection yoke 47. Appropriate scanning motion is imparted to the beam by the application to the yoke 47 of deflection waves produced by the deflection wave generator 36 under the control of the sync signal generator 32.

With the intensity of the scanning beam in kinescope 44 controlled in accordance with the composite signal output of adder 42, two superimposed visual displays are produced on the screen of the kinescope, one being a conventional black and white reproduction of the subject being scanned by the camera, and the other being a pattern of dots (or lines) produced by the phase and amplitude modulated color sampling frequency wave.

The displays produced on the kinescope screen are photographed on ordinary black and white motion picture films. The photographic apparatus may include a suitable lens arrangement 49 for focussing an image of the display upon an unexposed film strip 50, and an appropriate film drive mechanism (not shown).

In practicing the present invention it will be apparent that either continuous or intermitttnt film motion may be used in conjunction with various methods of tracing the displays. For example, the kinescope beam may be scanned horizontally only to produce successive single line displays which are recorded on a continuously moving (constant velocity) film strip. As another example, full display rasters of two interlaced fields each may be successively developed by the kinescope and recorded on successive frames of an intermittently moving film strip, the pull-down operation occurring during alternate blanking intervals.

Other scanning and film drive arrangements are readily applicable to use in the present invention, such as: the development of display rasters of two interlaced fields each, and the recording of each display raster on a given frame of a continuously moving film strip, the well-known principles of optical rectification being applied to achieve the recording of two interlaced fields on one continuously moving frame; or the development of display rasters each of which comprises one 525-line non-interlaced field, and the recording of each display raster on a separate frame of a continuously moving film strip, or of an intermittently moving film strip, where the pull-down operation occurs during each vertical blanking interval.

It will be apparent, from a consideration of the arrangements set forth above and the recognition that still other applicable arrangements exist, that practice of the present invention is not dependent on any particular choice of method of laying out the displays or accompanying methods of driving the film upon which the displays are to be recorded.

Upon completion of the program, scene, or other continuity subject to the scanning of the pickup system, the black and white film record includes a series of image frames, each comprising a photographic record of a color-informative dot (or line) pattern superimposed upon a black and white reproduction of the scanned subject during a given time interval of the continuity. After due processing (and editing, if appropriate) of the film, the record is readily available for utilization (as by methods which will be discussed later, involving the well-known "flying spot" scanning technique) in the recovery from each image frame of the brightness and chromaticity signals represented thereon.

However, it will be seen that if the recovered signals are to be used in arrangements directed to the reproduction of the recorded scenes in color (as contrasted with their use in arrangements directed to the black and white reproduction of the recorded scenes), there should be provisions for some form of "key" for "deciphering" the chromaticity signal to obtain the hue and saturation information it includes. With the chromaticity signal in the form of a phsae and amplitude modulated color sampling frequency wave, as in the present description, a practical method of providing such a "key" would be to provide a source of color sampling frequency oscillations of reference phase and amplitude against which the chromaticity signal might be compared.

One novel system for providing such a reference source using the apparatus of Fig. 1 will now be described, although it will be appreciated that other systems for providing such a reference source or other forms of the desired key may be used. A unique advantage of the reference system to be described is the substantial elimination of any distortion of the hue and saturation information which might normally be caused by scanning nonlinearities of the recording kinescope and the flying spot scanner of the recovery system (later to be described in connection with Fig. 2).

The essence of the recording aspect of this reference system is to use the same kinescope and photographic apparatus heretofore described to record, in addition to the image frames, a series of reference frames, the reference frames being photographic records of displays on the kinescope screen produced by controlling the intensity of the kinescope beam in accordance with a reference chromaticity signal (e. g. in present description, a color sampling frequency wave of reference phase and amplitude).

There are several available ways of deriving a color sampling frequency wave in a reference phase and amplitude from the apparatus of Fig. 1. One possibility is to turn off the three camera tubes, feed a predetermined constant voltage to the video signal input terminal of one modulator (e. g. green modulator 24) and thus apply through the normal chromaticity signal channel to kinescope grid 46 a color sampling frequency wave having a constant phase and amplitude representative of fully saturated green as a reference chromaticity value.

Another possibility is to turn off (or cap) two camera tubes, expose the third to an evenly lighted field, open the brightness channel, and thus apply to the kinescope grid through the normal chromaticity signal channel a constant reference chromaticity signal.

However, for convenience of illustration, the simple arrangement of providing a switch 43 in the kinescope signal input circuit, and connecting the output of reference frequency generator 26 to the "reference" terminal of that switch, has been shown. Thus, after completion of the recording of the image frames, the switch may be thrown from "image" position to "reference" position, and a series of dot-pattern displays produced by controlling the intensity of the kinescope beam with the constant color sampling frequency output of generator 26 are then recorded to provide a series of reference frames.

It will be appreciated that as an alternative to recording reference frames after the completion of the image recording period, the reference signals may be recorded at regular or irregular intervals during the image recording period. Automatic switching devices may then be desired to effect the changeovers between image and reference recording;

these may conveniently operate in the kinescope input cricuit as does switch 43, or in the camera tube output circuits as in accordance with the alternative reference signal derivation methods mentioned previously.

It will be seen that if any distortion of the chromaticity signals in their recorded form on the image frames results from non-linearity of scanning of the recording kinescope beam, substantially similar distortions of the reference chromaticity signal will occur in its recorded form on the reference frames, since its display is developed by the same beam scanning apparatus. Thus, in utilization of the film record, when the recovered chromaticity signal is compared with ("sampled" by) the recovered reference signal, those distortion effects introduced by recorded non-linearities effectively cancel out.

Figure 2:
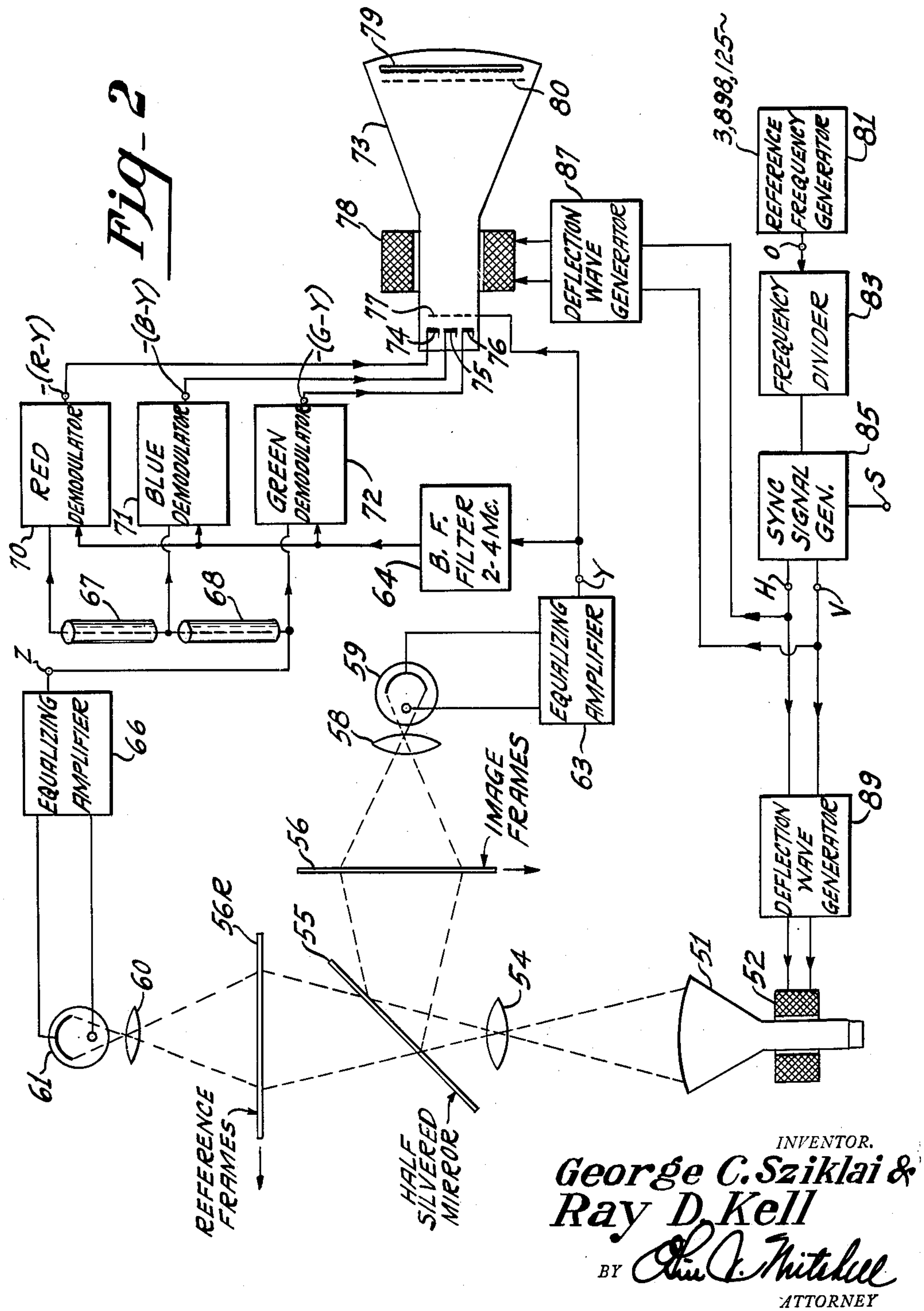
Figure 2 shows in block and schematic form a system for recovering color television signals from a black and white film record produced in accordance with the principles of the system shown in Figure 1, and additionally shows apparatus for using the recovered signals in a display reproduction of the color images.

Figure 2 of the drawings shows a system for recovering color image information from a black and white film record produced in accordance with the principles discussed in connection with Fig. 1. In addition, Fig. 2 shows one form of television apparatus, namely a color image reproducing system, for utilizing the recovered information. Suitable terminals are also indicated in Fig. 2, to which other forms of utilization apparatus, such as color television transmitting arrangements, may be connected. Some of these other forms of utilization apparatus will be discussed later in connection with Figs. 3 and 4.

The reference frames and the image frames of the film record are separated from each other and respectively assembled to form a film strip 56R of reference frames, and a film strip 56 of image frames. If only a few reference frames have been recorded as compared to the number of image frames recorded, the free ends of the reference strip 56R may be joined to form a continuous film loop.

The film strips 56 and 56R are then threaded in respective film paths of a flying spot pick-up system, which includes means for simultaneously scanning frames of both strips with light from the same scanning spot source. One way of providing such a system has been illustrated in Fig. 2, employing a conventional flying spot kinescope 51 (desirably having a short-persistence phosphor screen) as the scanning spot source, a suitable projecting lens arrangement 54, a half-silvered mirror 55 to split the light from source 51 into two paths passing respectively through the image frame strip 56 and the reference frame strip 56R, and collecting lens arrangements 58 and 60 to respectively direct light transmitted through the image frame strip 56 to a light responsive device 59, and light transmitted through the reference frame strip 56R to another light responsive device 61.

Impartation of scanning motion to the flying light spot is conventionally achieved by controlling the deflection of the kinescope beam via application of deflection waves produced by deflection wave generator 89, to the kinescope's deflection yoke 52. The particular type of scanning rasters to be developed (i. e. single line rasters, interlaced fields, etc.) will be primarily determined by the type of scanning raster employed in the recording operations, as discussed in connection with Fig. 1. Similarly, the type of film drive apparatus (not shown) used to synchronously drive image frame strip 56 and reference frame strip 56R will be determined by the film drive choice in the recording operations.

The light responsive devices 59 and 61, which respectively develop an image-representative signal in response to the scanning of the image frames of strip 56, and a reference signal in response to the simultaneous scanning of the reference frames of strip 56R, may be phototubes of the photomultiplier type (such as the RCA type 931A). The respective signal outputs of devices 59 and 61 are suitably amplified by amplifiers 63 and 66, respectively.

It has been noted in past work with flying spot pickup systems that in the absence of correcting means the rise and fall of phototube current during brightness transitions follow an exponential law due to the effects of phosphor persistence and spot motion. These effects were discussed, and equalizing means employing simple R-C combinations were suggested to compensate for these effects, in an article entitled "Pickup Equipment" by G. C. Sziklai, R. C. Ballard, and A. C. Schroeder, appearing as Part II of a group of papers on "An Experimental Simultaneous Color-Television System," published in the September 1947 issue of the Proceedings of the I. R. E. The pertinent section of the article is section IV, running from page 864 to page 866. Compensation for the phosphor decay characteristic and other factors contributing to signal distortion during brightness transitions may therefore be conveniently achieved in practicing the present invention by incorporating such equalizing means in the image and reference signal channels. Thus, amplifiers 59 and 61 may be similar in form to the equalizing amplifier shown in Fig. 9 on page 866 of the above-mentioned article.

The image representative signals appearing at the output terminal "Y" of the equalizing amplifier 63 are similar to the composite signal waves which were applied to control the beam intensity of the recording kinescope during the recording of the image frames. Though some distortion of the chromaticity signal component of the output wave at terminal "Y" may have occurred due to the non-linearity of scanning of the flying spot kinescope 51 (and the recording kinescope 44), the reference signal appearing at the output terminal "Z" of the equalizing amplifier 66 has been subjected to a substantially identical distortion due to its development from the same scanning devices. Thus, in the chromaticity signal demodulation operations to be described, wherein portions of the image-representative signals are compared with (or "sampled" by) the reference signal, the effects of the similar distortions of both image and reference signals mutually cancel.

Output terminal "Y" of the amplifier 63 is connected to band pass filter 64, having a pass band which encompasses the chromaticity signal frequencies. The signals passed by filter 64 are fed to the red, blue and green demodulators 70, 71, and 72, respectively. The three demodulators are also fed with three different phases of the reference signal appearing at terminal "Z." The phase shifting means, illustrated as delay lines 67 and 68, in the connections between terminal "Z" and the demodulators, provide that the red, blue and green demodulators are supplied with color sampling frequency waves in the same relative phase relationship as the corresponding red, blue, and green modulators 20, 22, and 24 (in Fig. 1) were so supplied during recording operations. Selective demodulation of the phase and amplitude modulated color sampling frequency wave by the mixing in demodulators 70, 71, and 72 of the passed portion of the image-representative signal from terminal "Y" with the appropriate phases of the unmodulated reference signal from terminal "Z" effectively recovers component color difference signals ("red-minus-brightness"; "blue-minus-brightness"; and "green-minus-brightness") in inverse polarity, the signals appearing at demodulator output terminals, $-(R-Y)$, $-(B-Y)$, and $-(G-Y)$, respectively.

Figure 2 additionally illustrates an arrangement including device 73 for reproducing the recorded images in color, the arrangement deriving its image information from the color difference signal terminals $-(R-Y)$, $-(B-Y)$, and $-(G-Y)$, and the wide-band signal terminal "Y." A color television transmitting arrangement, deriving its image information from the same terminals, will be discussed later in connection with Fig. 3. A further modification of utilization apparatus for the recovered signals, the apparatus deriving its operating signals directly from terminals "Y" and "Z," will also be discussed later in connection with Fig. 4.

In the present illustration, the image reproducing device 73 is a tri-color kinescope. It will be understood that the particular details of the image reproducing apparatus are relatively immaterial so far as the present invention is concerned. The form of kinescope 73 which is illustrated here is substantially of the same type as disclosed in a U. S. Patent 2,595,548, granted on May 6, 1952, to Alfred C. Schroeder, and titled "Picture Reproducing Apparatus."

Essentially, such a kinescope includes a luminescent screen 79 formed of a multiplicity of small phosphor dots, each of sub-elemental dimensions and arranged in groups and having such properties so as to be respectively capable of reproducing the image colors when excited by an electron beam. This type of kinescope also is provided with an apertured masking electrode 80 which is located behind the luminescent screen and is provided with apertures for and in alignment with the respective groups of phosphor dots. A plurality of electron beams, or as in another specific embodiment of such a tube, different components of a single beam are directed through the apertures of the mask 80 from different directions, thereby striking different phosphors capable of producing the different image colors.

In the present invention, these differently directed beams are derived from three separate electron guns having respective cathodes 74, 75, and 76. The control grids associated with the cathodes of the different electron guns all are connected together electrically. Accordingly, in the diagrammatic showing of Figure 4, grid control of the electron beam intensity of all three guns may be considered as effected by a grid electrode 77 common to all of the electron guns. As will be explained later, the separate cathodes 74, 75, and 76 are supplied with component color difference signals which are in effect algebraically added to the common brightness signal on the grid. This addition occurs because the beam intensity for each gun is a function of the potential difference between the cathode and the grid. Deflection of all three of the beams is effected by means of a common deflection yoke 78 which is energized by substantially sawtooth waves at the horizontal and vertical deflection frequencies as derived from the deflection wave generators 87.

It will be understood that the invention is not necessarily limited for use in conjunction with any particular type of image reproducing apparatus. Other types of multicolor kinescopes such as the kind having a plurality of electron guns and a direction luminescent screen may be used. Illustrative of such a type of kinescope is that disclosed in U. S. Patent 2,481,839 granted September 13, 1949, to Alfred N. Goldsmith for "Color Television." Also, it will be appreciated that a plurality of kinescopes, one for each color, may be used in such an arrangement that individual color images are combined optically for projection onto a viewing screen or for direct viewing. Typical arrangements of this sort are disclosed respectively in bulletins titled "A 15 by 20-Inch Projection Receiver for the RCA Color Television System" and "A Three-Color Direct-View Receiver for the RCA Color System" published, respectively, in October 1949 and January 1950 by Radio Corporation of America.

The "red-minus-brightness" signal appearing in inverse polarity at terminal $-(R-Y)$ is fed to the cathode 74 of the tri-color kinescope's "red" electron gun, while the wide-band brightness signal available at terminal "Y" is fed to the grids of all three electron guns in common (shown diagrammatically in Fig. 2 by the connection from terminal "Y" to the "common grid" 77). The net effect of the "red-minus-brightness" signal appearing in inverse polarity at the cathode 74 and the brightness signal appearing at the grid 77 is control of the intensity of the electron beam from the "red" electron gun in accordance with the sum of the "red-minus-brightness" and the brightness signals (i. e. in accordance with the "red" component color signal). Similarly, by connection of terminals $-(B-Y)$ and $-(G-Y)$ to the "blue" cathode 75 and the "green" cathode 76, respectively, control of the intensity of the "blue" and "green" electron beams is in accordance with blue and green component color signals, respectively. The result is a reproduction in color on the kinescope screen 79 of the original images which had been recorded on black and white film.

Synchronization of the deflection wave generators 87 and 89 is effected by driving pulses from a conventional sync signal generator 85. The generator 85 may be free-running where local display reproduction only is desired, but where television transmitting arrangements, such as shown in Fig. 3 and Fig. 4, are operating from the recovery apparatus of Fig. 2 in lieu of (or in addition to) the display apparatus, it will be appropriate to provide a reference frequency generator 81, operating through a frequency divider 83 to control the operation of sync signal generator 85. The generator 81 and divider 83 correspond in operation and purpose to the reference frequency generator 26 and frequency divider 30 which were discussed in connection with Fig. 1.

Figure 3:
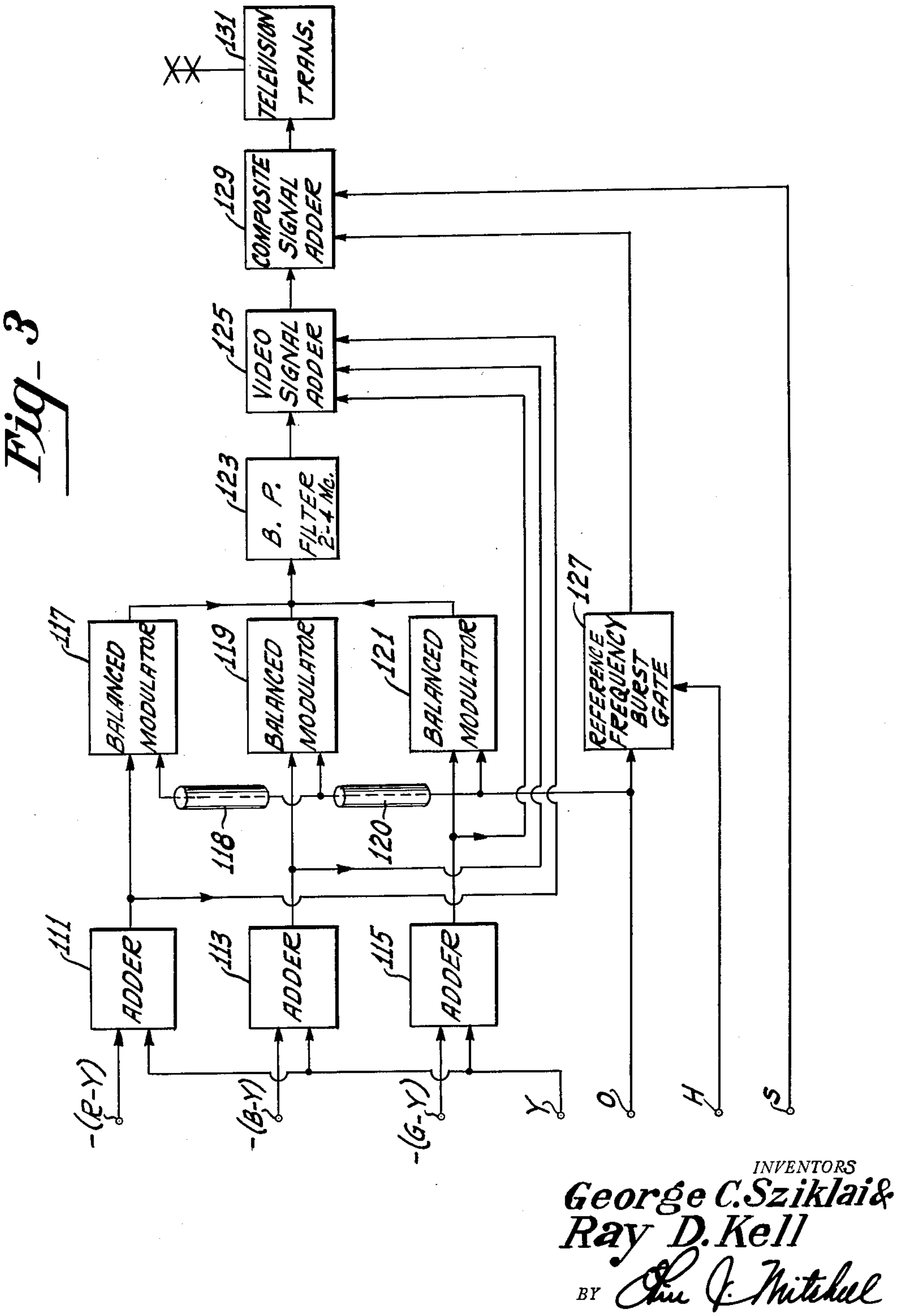
Figure 3 shows in block form one embodiment of a system for using the recovered signals in the formation of a composite color television signal suitable for transmission to remote image reproducers, the embodiment shown as connected to terminals of the recovery system of Figure 2 in lieu of, or in addition to, the display apparatus.
Figure 4:
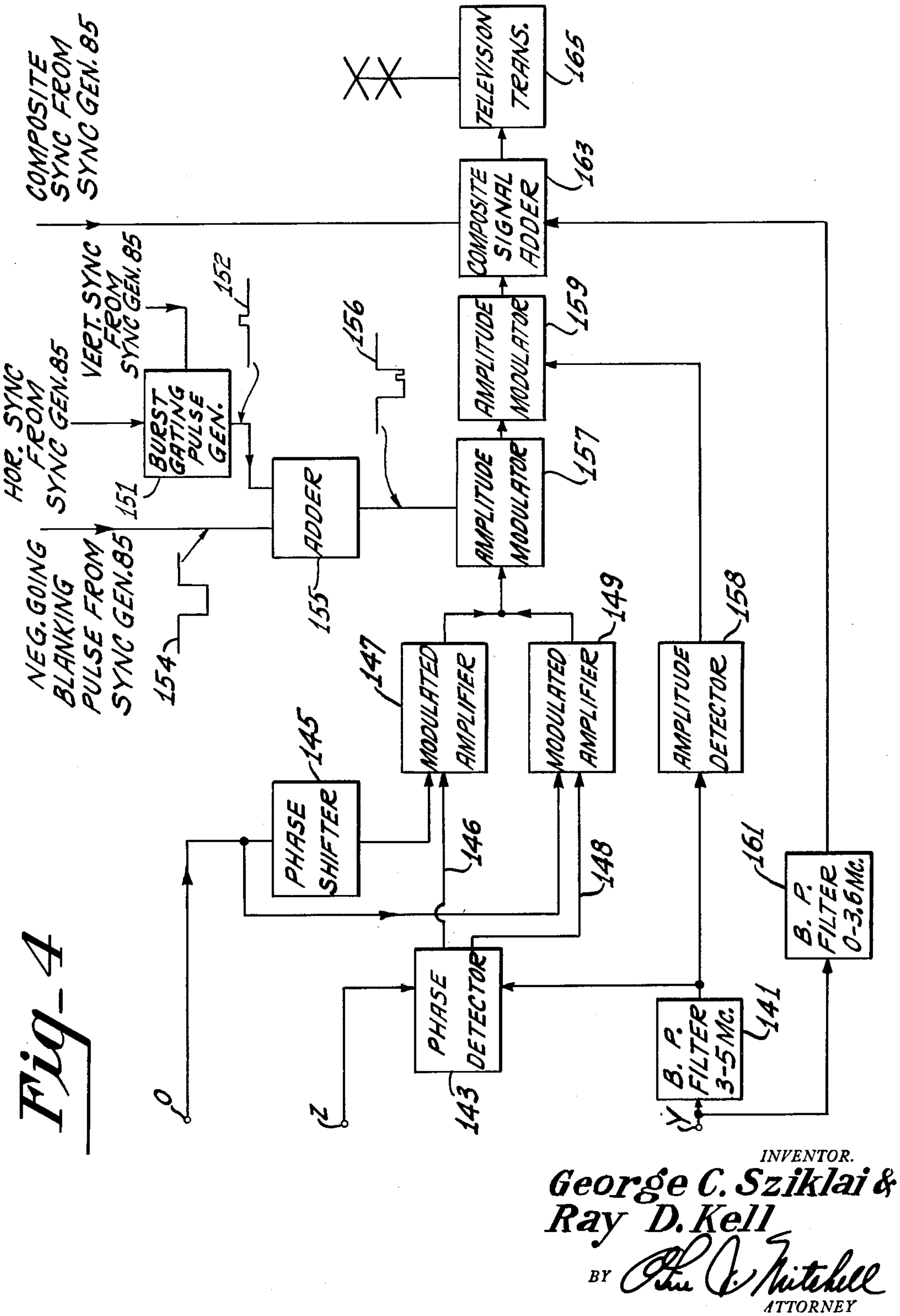
Figure 4 shows in block form another embodiment of a system for using the recovered signals in the formation of a composite color television signal suitable for transmission to remote image reproducers, this embodiment also being shown as connected to terminals of the recovery system of Figure 2 in lieu of, or in addition to, the display apparatus.

Fig. 3 shows additional equipment to be coupled to the recovery system of Fig. 2 to permit transmission of color television signals representative of the recorded images to remote image reproducers. Signal adders 111, 113, and 115 of conventional form are provided to obtain respective component color signals from the color difference signals appearing at terminals —(R—Y), —(B—Y), and —G—Y). Thus, for example, the inverse "red-minus-brightness" signal fed to adder 111 from terminal —(R—Y) is "subtracted" from the brightness signal fed to the adder from terminal "Y" to provide a "red" signal output. In similar operations adders 113 and 115 provide "blue" and "green" signal outputs, respectively.

Portions of these output signals are fed directly to a video signal adder 125 to provide a wide-band signal representative of the brightness of the images. The output terminals of the three adders 111, 113 and 115 are also coupled respectively to red, blue and green balanced modulators 117, 119 and 121. The three modulators are also fed with three different phases of a color sampling frequency wave supplied to terminal O by reference frequency generator 81. Delay lines 118 and 120 have been shown in the connections from terminal O to the modulators as means to establish the desired phase relationship. The modulators 117, 119, and 121 operate in the same manner as did modulators 20, 22, and 24 (as discussed in connection with Fig. 1) to provide as an output color sampling frequency waves modulated in phase in accordance with hue information and modulated in amplitude in accordance with saturation information.

The phase and amplitude modulated waves are fed through band-pass filter 123 to the video signal adder 125, wherein they are added to the brightness signals. The composite video signal output of adder 125 is fed to the composite signal adder 127 for combination with the conventional composite sync pulse train (obtained from terminal "S" of the sync signal generator 85) to form a composite television signal suitable for broadcast or line transmission.

For the maintenance of color "sampling" synchronism there is transmitted, along with the conventional composite television signal, a burst consisting of several cycles at the color sampling frequency during the blanking interval and immediately following each horizontal synchronizing pulse. A more complete disclosure of this and other types of color synchronizing which may be used is given in a bulletin published in February 1950 by Radio Corporation of America and titled "Recent Developments in Color Synchronization in the RCA Color Television System." Also the burst type of color synchronizing forms the subject matter of the copending U. S. application of Alda V. Bedford, Serial No. 143,800, filed September 24, 1949, and titled "Synchronizing Apparatus."

In accordance with usual practice, this burst of color sampling frequency is superimposed upon the blanking pedestal in the so-called back porch region. Consequently the transmitting arrangement of Figure 3 also includes a reference frequency burst gate 127 which may be a conventional gating type of amplifier. The input circuit of the gate 127 is coupled to output terminal "O" of the reference frequency generator 81 and the controlling circuit of the gate is coupled via suitable time delay and gating circuits to the output terminal (H) of the sync signal generator 85 at which the horizontal synchronizing pulses are produced. Accordingly a burst of the reference frequency derived from generator 81 is permitted to pass to the output circuit of the gate 39 (and thence to the composite signal adder 129 for combination in the composite television signal) immediately following each horizontal sync pulse.

The composite television signal derived from the adder 129 may be conveyed to suitable image reproducing apparatus by any of the usual means. Where the arrangement of Fig. 3 is used in systems in which the composite television signal is conveyed to the image reproducing apparatus by means of a radio channel, the adder 129 may be coupled to a television transmitter 131. It will be understood that the transmitter may be conventional, including facilities for modulating a main carrier wave with the composite television signal for radiation into space.

Fig. 4 shows another arrangement which may be utilized in conjunction with the recovery system of Fig. 2 to produce color television signals, representative of the recorded images, in suitable form for transmission to remote image reproducers.

Reference signals appearing at terminal "Z" are compared in phase with the image-representative signals passed by filter 141 in a conventional phase detector 143. For purposes of illustration the pass band of filter 141 has been set forth as 3 to 5 megacycles. With the exemplified color sampling frequency being 3,898,125 cycles, this permits double sideband operation in the phase comparator. It will be appreciated that if this operation is desired, the pass bands of filter 40 and adder 42 in the recording system of Fig. 1 must be commensurate in scope (i. e. must at least extend to 5 megacycles in the given example).

It would be well to point out at this time that the limitations on video signal bandwidth, generally imposed due to the conventional 6 megacycle width of television channel bands, are not controlling in the recording and recovery operations themselves. Thus video signals up to 5 megacycles, or beyond, may be recorded and recovered, so long as operations directed toward the broadcast transmission of the recovered signal revert the image information to a form satisfying the broadcast bandwidth restrictions. It will therefore be appreciated that the various frequency and bandwidth values set forth in the drawings and the description are examples only, and the invention is not in any way restricted to the specific values expressed.

The output of phase detector 143, varying in amplitude in accordance with the shifts in phase of the image-representative signals from the reference phase of the signals appearing at terminal "Z," is utilized to control the phase modulation of color sampling frequency oscillations, appearing at terminal "O" of the reference frequency generator 81. While any one of various known phase modulation schemes may be employed here, a differential phase modulator has been illustrated which is of the type shown and discussed on page 126 of the Proceedings of the I. R. E. for February 1939, in an article entitled "Communication by Phase Modulation" by Murray G. Crosby.

In this type of phase modulation system, which is also shown and discussed on pages 583 and 584 of "Radio Engineer's Handbook" by Frederick E. Terman, two class C amplifiers are differentially modulated with the modulating signal, and are excited with radio frequency voltages differing in phase (e. g. by 90°). The combined output of the system will vary in phase during modulation as a result of the fact that the relative contributions from the two amplifiers are varied by the modulation. Thus, a pair of amplifiers, 147 and 149, are shown in Fig. 4, the amplifier 149 being excited by color sampling frequency waves fed directly from terminal "O," and the amplifier 147 being excited by phase shifted color sampling frequency waves fed from terminal "O" through the phase shifter 145. The output of the phase detector is fed push-pull to the amplifiers 147 and 149, as indicated by the connections 146 and 148. The resultant voltage of color sampling frequency in the common output circuit is deviated in phase in accordance with the phase detector output (and thus in accordance with hue information) between limits which are determined by the phase separation of the color sampling frequency voltages fed to the two modulated amplifiers. The combined output of amplifiers 147 and 149 may be passed through an amplitude limiter (not shown) to remove the residual amplitude fluctuations.

The next modulating stage serves to pass the phase modulated color sampling frequency waves with a constant amplitude during forward line scans, and to blank out the unmodulated color sampling frequency output of the amplifiers 147 and 149 during horizontal and vertical blanking intervals (except for a portion of the "back porch" region of each horizontal blanking interval when an unmodulated color sampling frequency burst is permitted to pass for color synchronization use). Thus, the phase modulated output of amplifiers 147 and 149 is shown as being fed to an amplitude modulator 157, which may be of the modulated amplifier type. In the absence of modulating pulses from adder 155, the bias conditions on modulator 157 are such as to permit the phase modulated waves to pass with a predetermined constant amplitude. During the blanking intervals, however, modulating pulses appearing in the output of adder 155 vary these conditions. During each horizontal blanking interval, the output of adder 155, as shown by waveform 156, is a negative going pulse, having a shallow positive-going serration in its back porch region. The effect of this modulating pulse is to cut off the modulator 157 during the entire blanking period, except for the short serration interval in the back porch region when (constant phase) color sampling frequency waves are passed with a predetermined small amplitude.

The modulating pulse shown in waveform 156 is produced by the combination in adder 155 of negative-going blanking pulses (as shown in waveform 154), obtained from the conventional sync signal generator 85, with positive-going pulses (as shown in waveform 152) obtained from a source 151. The back-porch pulse source 151, labelled as a burst gating pulse generator, may be generally similar in form to the arrangement for providing burst gating pulses which was shown in Fig. 10 of the aforementioned publication, entitled "Recent Developments in Color Synchronization in the RCA Color Television System."

The pulse generator 151, thus may include: a normally open gate through which horizontal sync pulses from sync signal generator 85 pass; a first multivibrator, under the control of vertical sync pulses from sync generator 85, which closes the normally open gate during the vertical sync portion of the vertical blanking interval; a delay multivibrator triggered by the passed horizontal sync pulses, and providing "stretched" output pulses (i. e. with delayed trailing edges); and a gate pulse generating multivibrator triggered by the trailing edges of the delay multivibrator's output pulses to provide the desired positive-going "back-porch" pulses shown in waveform 152. It is to be noted that by virtue of the gate-closing action of the first multivibrator mentioned above, burst gating pulses will not appear in the output of generator 151 during the vertical sync portion of a vertical blanking interval. As an alternative to the use of the delay multivibrator and the gating pulse generating multivibrator, the generator 151 may employ R-C phase shifting networks to suitably delay the passed horizontal sync pulses, and clipping circuits or other wave shaping circuits to square off the delayed pulses into the form of "back-porch" pulses shown in waveform 152.

The output of modulator 157 is fed to modulator 159, which serves to amplitude modulate the phase modulated color sampling frequency waves in accordance with saturation information, obtained by detecting in amplitude detector 158 the amplitude variations of the waves passed by filter 141.

A conventional composite signal adder 163 combines the phase and amplitude modulated color sampling frequency waves (appearing in the output of modulator 159 during video signal intervals), the wideband brightness signal (i. e. image-representative signals from terminal "Y" passing through filter 161), the conventional composite sync pulse train obtained from sync generator 85, and the burst of constant-phase color sampling frequency waves (appearing in the output of modulator 159 during back-porch periods of blanking intervals) to form a composite color television signal. The composite signal derived from the adder 163 may be conveyed to suitable image reproducing apparatus by any of the usual means, such as a conventional television transmitter 165.

In the foregoing description of embodiments of the present invention, wherein the recording medium has been particularly described as film, photographic recording techniques and "flying spot" recovery techniques have been presented as appropriate to the desired operations. The broad principles of the present invention however are also applicable to embodiments wherein other "monochromatic" (i. e. not essentially color sensitive) recording media, such as magnetic tape, may be employed. Thus, for example, by suitable modifications of the described systems, the brightness and chromaticity signals may be recorded as superimposed magnetic displays, and recovery operations may employ magnetic pick-up devices.

While the invention has been described in relation to a relatively basic form of simultaneous color television system, it is readily apparent that the invention is applicable to use with more complex, improved, and augmented simultaneous color television systems. Thus, the invention may easily be adapted to incorporate such features as "color phase alternation," "constant luminance," gamma correction, phase equalization, and others. A recent discussion of some of these features is to be found in an article entitled, "Principles of NTSC Compatible Color Television," by C. J. Hirsch, W. F. Bailey, and B. D. Loughlin, in the February 1952 issue of Electronics.

It should also be pointed out that the invention is not restricted to use directed toward local image reproduction in color or transmission to remote color image reproducers, but rather also provides utility, particularly when employing some of the improvements listed above, where it is directed toward local image reproduction in black and white or transmission to remote black-and-white image reproducers.

Also, while the description of the invention has continually referred to television systems, television apparatus, television signals, etc. the field of use of the invention is not limited to the television industry as it is known today. The invention suggests a new, different, time-saving and economical system for producing and displaying motion pictures in color, and thus has significant applicability to the motion picture industry though involving "television" pickup and display apparatus.

Though a discussion of an accompanying sound system has not been presented in the foregoing description, it should be apparent that there are well-known optical, mechanical, magnetic and other techniques of recording sound to accompany film records, magnetic tape records, etc. which may conveniently be employed in conjunction with the present invention to provide sound-and-color-picture recordings and presentations.

What is claimed is:

1. A color image signal translating system comprising a source of signals representative of the brightness of the images during normal operating periods, a second source of signals representative of the chromaticity of the images during said normal operating periods and representative of a reference chromaticity value during reference periods of operation, means for simultaneously converting the signals from said two sources into superimposed visual displays during said normal operating periods and for converting the signals from said second source into reference visual displays during said reference periods, means for recording the superimposed visual displays on a photographic recording medium during said normal operating periods and for recording the reference visual displays on a photographic recording medium during said reference periods, and signal reproducing means including flying spot scanning means for scanning the recording of said superimposed displays while simultaneously scanning the recording of said reference displays, light-responsive means associated with said scanning means for producing image-representative signals in response to the scanning of said superimposed display recording, additional light-responsive means associated with said scanning means for producing reference signals in response to the scanning of said reference display recording, and television apparatus coupled to both of said light-responsive means for utilizing said image-representative signals and said reference signals.

2. A signal translating system in accordance with claim 1 wherein said television apparatus includes means for mixing said reference signals with said image-representative signals to produce color-difference signals.

3. A signal translating system in accordance with claim 2 wherein said television apparatus also includes a color image reproducing device responsive to said color-difference signals and to said image-representative signals.

4. A signal translating system in accordance with claim 2 wherein said television apparatus also includes means for adding said color-difference signals to said image-representative signals to produce component color signals, and means for utilizing the component color signals to form a composite color television signal.

5. A color image signal translating system comprising a source of signals representative of the brightness of the images during normal operating periods, a second source of signals representative of the chromaticity of the images during said normal operating periods and representative of a reference chromaticity value during reference periods of operation, means for simultaneously converting the signals from said two sources into superimposed visual displays during said normal operating periods and for converting the signals from said second source into reference visual displays during said reference periods, means for recording the superimposed visual displays on a photographic recording medium during said normal operating periods and for recording the reference visual displays on a photographic recording medium during said reference periods, and signal reproducing means including flying spot scanning means for scanning the recording of said superimposed displays while simultaneously scanning the recording of said reference displays, light-responsive means associated with said scanning means for producing image-representative signals in response to the scanning of said superimposed display recording, additional light-responsive means associated with said scanning means for producing reference signals in response to the scanning of said reference display recording, and television apparatus coupled to both of said light-responsive means for utilizing said image-representative signals and said reference signals, said apparatus including phase comparison means for comparing the phase of the reference signals with the phase of the image-representative signals, a source of oscillations, means for phase modulating oscillations from said source in accordance with the output of said phase comparison means, an amplitude detector for detecting the amplitude of the image-representative signals, means for amplitude modulating the output of said phase modulating means in accordance with the output of said amplitude detector, and means for adding the output of said amplitude modulating means to the image-representative signals.

6. A system for translating signals representative of color images comprising a source of signals representative of the brightness of the images, a second source of signals representative of the chromaticity of the images, and means for simultaneously recording the signals from said two sources as superimposed displays.

7. A system for recording signals representative of color images comprising a source of signals representative of the brightness of the images, a source of signals representative of the chromaticity of the images, means for simultaneously converting the signals from said two sources into superimposed visual displays, and means for photographically recording the superimposed visual displays.

8. A system for recording signals representative of color images, the signals being derived from color television pickup apparatus, said recording system comprising a source of signals representative of the brightness of the images during normal operating periods of said pickup apparatus, a second source of signals representative of the chromaticity of the images during normal operating periods of said pickup system and representative of a reference chromaticity value during reference periods of operation of said pickup apparatus, means for simultaneously converting the signals from said two sources into superimposed visual displays during said normal operating periods and for converting the signals from said second source into reference visual displays during said reference periods, and means for photographically recording the superimposed visual displays during said normal operating periods and the reference visual displays during said reference periods.

9. A signal recording system for use with a color television pick-up system of the simultaneous type wherein during normal operating periods there are produced brightness signals representative of the brightness of image elements and chromaticity signals representative of the chromaticity of image elements, the chromaticity signals comprising high frequency oscillations phase modulated in accordance with the hue of image elements and amplitude modulated in accordance with the saturation of image elements, and wherein during reference periods of operation there is produced a reference chromaticity signal representative of a reference chromaticity value, said signal recording system comprising cathode ray tube means for developing display rasters, said cathode ray tube means including beam intensity controlling means for controlling the developments of said display rasters, means for simultaneously applying the brightness signals and the chromaticity signals to said beam intensity controlling means during said normal operating periods and for applying the reference chromaticity signal to said beam intensity controlling means during said reference periods, and means for photographing said display rasters.

10. Signal translating apparatus for use with a video signal film record including a film strip comprising a series of image frames and a continuous film loop comprising a series of reference frames, said translating apparatus comprising, in combination, cathode ray tube means for developing a pair of scanning light spots, means associated with said cathode ray tube means for simultaneously deflecting said light spots to scan, respectively, an image frame and a reference frame, light responsive means associated with said film strip for deriving image-representative signals during the scanning of each image frame, and additional light responsive means associated with said film loop for deriving reference signals during the scanning of each reference frame, and signal utilization means coupled to both of said light responsive means.

11. Signal translating apparatus for use with a video signal film record having a first portion comprising a series of image frames and a second portion comprising a series of reference frames, said translating apparatus comprising, in combination, flying spot scanning means for scanning said image frames while simultaneously scanning said reference frames, light responsive means associated with said scanning means for producing image-representative signals in response to the scanning of said image frames, and additional light responsive means associated with said scanning means for producing reference signals in response to the scanning of said reference frames.

12. Signal translating apparatus in accordance with claim 11 wherein each of said image frames is a photographic record of a cathode ray tube display of a raster developed under the simultaneous control of image-representative brightness and chromaticity signals, and each of said reference frames is a photographic record of a cathode ray tube display of a raster developed under the control of a reference chromaticity signal.

13. Signal translating apparatus in accordance with claim 12 wherein the image-representative signals produced by said first-named light-responsive means during the scanning of an image frame correspond to the image-representative brightness and chromaticity signals which controlled the development of the cathode ray tube display raster of which that image frame is a record.

14. Signal translating apparatus in accordance with claim 13 wherein the reference signal produced by said additional light-responsive means during the scanning of a reference frame corresponds to the reference chromaticity signal which controlled the development of the cathode ray tube display raster of which that reference frame is a record.

15. Signal translating apparatus for use with a video signal film record having a first portion comprising a series of image frames and a second portion comprising a series of reference frames, said translating apparatus comprising in combination flying spot scanning means for scanning said image frames while simultaneously scanning said reference frames, light responsive means associated with said scanning means for producing image-representative signals in response to the scanning of said image frames, additional light responsive means associated with said scanning means for producing reference signals in response to the scanning of said reference frames, and means for mixing the image-representative signals with the reference signals to produce color-difference signals.

16. Signal translating apparatus for use with a video signal film record having a first portion comprising a series of image frames and a second portion comprising a series of reference frames, said translating apparatus comprising, in combination, flying spot scanning means for scanning said image frames while simultaneously scanning said reference frames, light responsive means associated with said scanning means for producing image-representative signals in response to the scanning of said image frames, additional light responsive means associated with said scanning means for producing reference signals in response to the scanning of said reference frames, means for mixing the image-representative signals with the reference signals to produce color-difference signals, means for adding the color-difference signals to the image-representative signals to produce component color signals, means for utilizing the component color signals to form a composite color television signal, and means for transmitting said composite color television signal.

17. Signal translating apparatus for use with a video signal film record having a first portion comprising a series of image frames and a second portion comprising a series of reference frames, said translating apparatus comprising, in combination, flying spot scanning means for scanning said image frames while simultaneously scanning said reference frames, light responsive means associated with said scanning means for producing image-representative signals in response to the scanning of said image frames, additional light responsive means associated with said scanning means for producing reference signals in response to the scanning of said reference frames, phase comparison means for comparing the phase of the reference signals with the phase of the image representative signals, a source of oscillations, means for phase modulating oscillations from said source in accordance with the output of said phase comparison means, an amplitude detector for detecting the amplitude of the image-representative signals, means for amplitude modulating the output of said phase modulating means in accordance with the output of said amplitude detector, and means for adding the output of said amplitude modulating means to the image-representative signals.

18. Apparatus for reproducing color images from a film record, said record having a first portion comprising a series of image frames and a second portion comprising a series of reference frames, said reproducing apparatus comprising flying spot scanning means for scanning said image frames while simultaneously scanning said reference frames, a first photoelectric device associated with said scanning means for producing image-representative signals in response to the scanning of said image frames, a second photoelectric device associated with said scanning means for producing reference signals in response to the scanning of said reference frames, means for mixing said reference signals with said image-representative signals to produce color-difference signals, and a color image reproducing device responsive to said color-difference signals and to said image-representative signals.

19. A method of translating color image signals which comprises deriving a first signal representative of the brightness of an image, deriving a second signal representative of the chromaticity of an image, deriving a third signal representative of a reference chromaticity value, simultaneously converting the first and second signals into superimposed visual displays, photographically recording the superimposed displays, converting the third signal into reference visual displays, and photographically recording the reference displays.

20. A method of translating color image signals which comprises deriving brightness signals representative of image brightness, deriving chromaticity signals representative of image chromaticity, deriving reference signals representative of a reference chromaticity value, simultaneously recording the brightness and chromaticity signals as superimposed displays, and additionally recording the reference signals as reference displays.

References Cited in the file of this patent

UNITED STATES PATENTS

| | | |
|---|---|---|
| 1,968,836 | Karnes et al. | Aug. 7, 1934 |
| 2,412,098 | Schantz | Dec. 3, 1946 |
| 2,470,592 | Waller | May 17, 1949 |
| 2,590,281 | Sziklai et al | Mar. 25, 1952 |
| 2,594,380 | Barton et al. | Apr. 29, 1952 |
| 2,594,715 | Angel | Apr. 29, 1952 |
| 2,612,553 | Homrighous | Sept. 30, 1952 |
| 2,627,547 | Bedford | Feb. 3, 1953 |
| 2,658,102 | Goldsmith | Nov. 3, 1953 |